(12) United States Patent
Arias

(10) Patent No.: US 6,569,391 B1
(45) Date of Patent: May 27, 2003

(54) HEAP LEACHING COPPER ORE USING SODIUM NITRATE

(75) Inventor: Jaime A. Arias, Antofagasta (CL)

(73) Assignee: Ingesol LTDA. (CL)

( * ) Notice: Subject to any disclaimer, the term of this patent is extended or adjusted under 35 U.S.C. 154(b) by 348 days.

(21) Appl. No.: 09/024,413

(22) Filed: Feb. 17, 1998

(51) Int. Cl.[7] .............................................. C22B 15/00
(52) U.S. Cl. ........................................ 423/41; 205/583
(58) Field of Search .................... 423/41, 27; 205/583, 205/584

(56) References Cited

U.S. PATENT DOCUMENTS

| | | | | |
|---|---|---|---|---|
| 287,737 A | * | 10/1883 | Stetefeldt ...................... | 423/41 |
| 1,021,768 A | * | 4/1912 | Gahl ............................ | 423/41 |
| 1,737,425 A | * | 11/1929 | Mackay ....................... | 205/583 |
| 2,009,667 A | * | 7/1935 | Keyes .......................... | 423/41 |
| 3,269,832 A | * | 8/1966 | Abell et al. ................... | 423/41 |
| 3,793,429 A | | 2/1974 | Queneau et al. .............. | 423/34 |
| 3,910,636 A | | 10/1975 | Hard .............................. | 299/5 |
| 3,912,330 A | * | 10/1975 | Carnahan et al. ............. | 423/41 |
| 4,043,599 A | * | 8/1977 | Lingane et al. ............... | 423/36 |
| 5,336,476 A | * | 8/1994 | Kintaichi et al. ........ | 423/239.1 |
| 5,403,382 A | * | 4/1995 | Fairbanks .................... | 75/726 |

FOREIGN PATENT DOCUMENTS

| | | | |
|---|---|---|---|
| SU | 1458406 | 2/1989 | |
| SU | 1581761 | * 7/1990 | .................. 423/41 |

OTHER PUBLICATIONS

"Nitric–Sulfuric Leach Process Improvements", Davies et al., *Mining Eng.* 33(8), 1252–9, 1981, no month.
"Nitric–Sulfuric Leach Process for Recovery of Copper from Concentrates", Davies et al., *Mining Eng.* 33(8), 1259–66, 1981, no month.
"Nitric Acid Route to Processing Copper Concentrates" Prater et al., *Trans. Soc. Mining Eng. AIME*, 254(2), 117–22, (1973), no month.

* cited by examiner

*Primary Examiner*—Steven Bos
(74) *Attorney, Agent, or Firm*—Paul F. White

(57) ABSTRACT

The heap leaching of copper bearing ores is improved by using sodium nitrate as an oxidizing chemical reactive in a sulphuric acid leaching solution. In particular, the ore is crushed to <6 mm and stored in heaps less than twelve meters high. The heaps are irrigated with a dilute solution consisting essentially of sulphuric acid and sodium nitrate to produce a leach product. The leach product is recovered from the heap and copper is recovered from the leach product by electrolysis. The pH of the heap is preferably maintained at $\leq 1.7$ pH.

8 Claims, 2 Drawing Sheets

HEAP LEACHING COPPER ORE USING SODIUM NITRATE

BACKGROUND OF THE INVENTION

1. Field of the Invention

This invention relates to hydrometallurgical processes and, in particular, to heap leaching copper ore using a solution including sodium nitrate.

2. State of the Art

Chemical processes to obtain copper metal are becoming increasingly important due to their relative simplicity and environmental compatibility, as compared to traditional thermal processes. Heap leaching has the advantages of low investment cost and low operating costs. Presently, there are two principal techniques within the mining industry for treating sulfide ores by heap leaching. These are bacterial heap leaching and acid heap leaching.

Bacterial leaching of copper ore is generally faster than acid leaching because bacterial leaching combines the oxidizing biochemical activity of bacteria with the chemical action of sulphuric acid and oxygen. The process includes irrigating a mineral heap with a dilute solution of sulfuric acid inoculated with a given strain of bacteria. The bacteria used, for example, *Thiobacillus ferrooxidans, Leptospirillum ferrooxidans,* or others, are cultivated from bacteria naturally occurring on the ore and are essentially strains of bacteria adapted to the specific physical-chemical conditions existing in the environment of a particular ore deposit.

Presently, the most widely used sulphide ore leaching process in industry is bacterial leaching. This process has the advantage of low investment cost, low operational cost, and relatively low final cost per pound of fine copper produced (approximately US$ 0.50/lb at present). This process also has some undesirable characteristics such as a reaction time measured in months (usually six months for recoveries about 60%, nine months for recoveries about 85%) and comparatively low recoveries that fluctuate between 65% and 85% of the metal contained in the ore. The life and proliferation of bacteria depend critically on temperature, acidity, and availability of nutrients.

Acid leaching is potentially more efficient than bacterial leaching but this potential has not been realized in the prior art. Acid leaching is similar to corrosion in that the leaching phenomenon occurs throughout the whole structure of the ore mineral crystals, whereas the leaching by bacteria occurs only where the bacteria are emplaced, that is, only on the surface of the ore mineral crystals in contact with the solution. This difference implies a difference in the number of sites where leaching occurs, which clearly favors acid leaching due to its action at a molecular level throughout the whole structure of the sulphide ore mineral crystals; that is, throughout the whole volume of the crystals that are in contact with the leaching solution.

Heap leaching typically uses sulfuric acid and ferric sulfate as the oxidant in a solution. Ferric sulfate is obtained from decomposition reactions of sulfides (pyrite and chalcopyrite) through the combined action of water dissolved sulfuric acid and oxygen.

U.S. Pat. No. 287,737 (Stetefeldt) discloses treating cakes of ore in a vessel with sulphuric acid and sodium nitrate to recover copper and silver. The $NO_x$ gases produced are recovered in a water spray.

U.S. Pat. No. 3,793,429 (Queneau et al.) discloses using nitric acid for recovering copper and other metals from sulphide ore. The $NO_x$ gases produced are recovered with cool water and oxygen to regenerate nitric acid.

U.S. Pat. No. 3,912,330 (Carnahan et al.) discloses a process for chemically treating copper ores with a mixture of nitric acid and sulphuric acid with oxygen under pressure and discloses that the process in not suited to heap leaching.

U.S. Pat. No. 5,403,382 (Fairbanks) discloses heap leaching copper ore with sulphuric acid at a pH of 1.5.

To be competitive with bacterial leaching and thermal techniques, acid leaching must be made faster without adversely affecting the environment. The $NO_x$ gases produced by the processes described in the Stetefeldt patent and the Carnahan et al. patent make these processes undesirable from an environmental standpoint. The problem is made more acute by the fact that increasing the speed of the reaction process generally causes more $NO_x$ gases to be produced, not less. Adding equipment to recover the $NO_x$ gases only increases the cost of the process.

It is obviously less expensive to transport copper than to transport copper ore. A problem with prior art processes, particularly the process described in the Carnahan et al. patent is that the site of the ore is typically not at sea level, i.e. oxygen is less abundant and providing additional oxygen, even in the form of compressed air, excessively increases the cost of the process.

In view of the foregoing, it is therefore an object of the invention to provide a faster process for leaching copper ore with acid.

Another object of the invention is to provide a process for leaching copper ore that is cost competitive with other processes.

A further object of the invention is to provide a process for leaching copper ore in which the emission of $NO_x$ gases is eliminated without the use of separate recovery apparatus.

Another object of the invention is to provide a process for leaching copper ore to recover at least 85% of the available copper.

A further object of the invention is to provide a process for leaching copper ore without the addition of gaseous oxygen.

SUMMARY OF THE INVENTION

The foregoing objects are achieved in this invention in which sodium nitrate is an oxidizing chemical reactive in a sulphuric acid leaching solution. In particular, the ore is crushed to <6 mm and stored in heaps less than twelve meters high. The heaps are irrigated with a dilute solution consisting essentially of sulphuric acid and sodium nitrate to produce a leach product. The leach product is recovered from the heap and copper is recovered from the leach product by electrolysis. In accordance with another aspect of the invention, acid leaching with sodium nitrate is dependent on acidity (pH), which is maintained at $\leq 1.7$ pH.

DETAILED DESCRIPTION OF THE INVENTION

Figure 1:
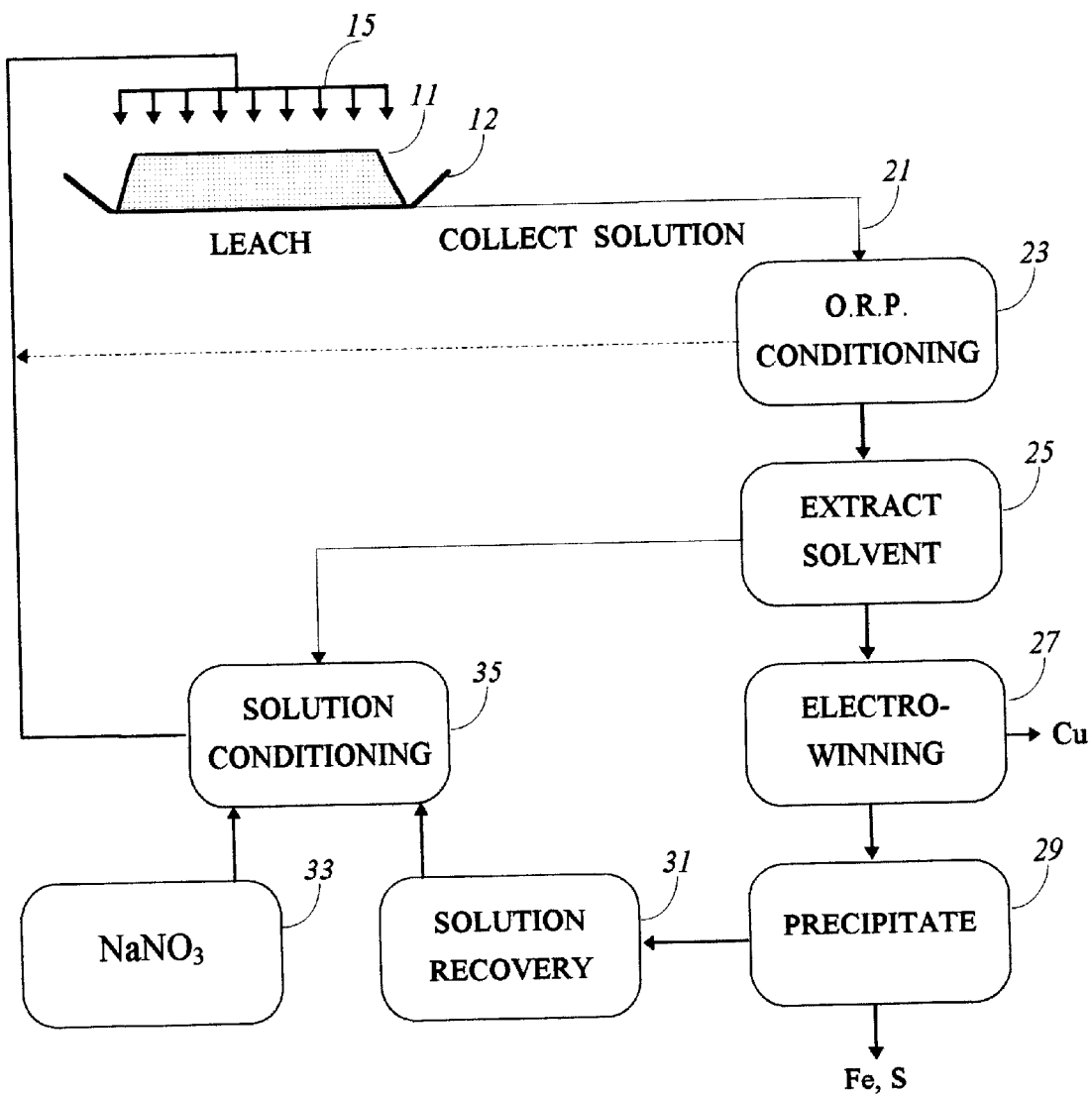
FIG. 1 illustrates the steps of a heap leaching process in accordance with the invention.

Heap leaching includes the steps of crushing, agglomeration, stacking, leaching, solvent extraction, solution recovery, electrowinning, raffinate solution recovery, filtering and storing, reconditioning the leaching solution, and recirculation. The chemical processing steps are illustrated in FIG. 1, including the steps of the invention.

Crushing reduces the size of the ore material to increase the surface area of a given mass of ore. It is preferred that the ore be crushed until each particle has a maximum dimension of 0.25" (6 mm). Other sizes, such as ⅝" (15 mm) can be used, depending upon the type of ore and the leaching characteristics of the ore.

Agglomeration entails soaking the ore with concentrated sulphuric acid (curing) in a revolving inclined drum to mix the ore and to impregnate the ore with the acid. This step produces a very strong initial chemical attack on the ore, mechanically stressing and cracking the minerals, thus increasing the surface area exposed to leaching. This step also agglomerates the fine ore particles to prevent them from clogging open spaces in the ore heap and reducing the circulation of leaching solution through the stacked ore. In one embodiment of the invention, 15 kg. of $H_2SO_4$ per ton (1000 kg.) of ore was applied to a column simulating heap leaching. Depending upon the content of acid consuming gangue minerals present in the ore, a higher concentration or a lower concentration of acid can be used to cure the ore.

The stacking step entails forming a heap of ore on a leaching pad. After agglomeration, the ore is transported, usually by conveyor belt, and deposited layer upon layer to form a heap using a mobile open-ended conveyor belt called a stacker. Ore heap 11 can be up to twelve meters high, twenty-five meters wide, and tens to hundreds of meters long and have a trapezoidal shape in cross-section. Leaching pad 12 is a planar, slightly inclined, compacted soil surface lined with the high density polyethylene film that serves as an impermeable collection surface for the leach solutions. The lined pads have raised edges to form a pool-like open containment. After construction of a pad and a collecting system, and the subsequent stacking of the ore, a series of irrigation pipes and spraying nozzles, represented at 15, are distributed at regular intervals above the heap for spraying leaching solution on the heap.

For leaching, the leach solution includes water, acid, and an oxidizing chemical. The leach solution is sprayed over the surface of the heap and reacts with the crushed ore, percolating through pores and fractures and collecting at the base of the heap. The copper-rich solution moves down along the impermeable plastic liner to collecting troughs and a piping system (not shown).

In accordance with the invention, the leach solution is an acid-oxidizing solution consisting essentially of sulfuric acid ($H_2SO_4$) and sodium nitrate ($NaNO_3$) in specific concentrations. The $H_2SO_4$ concentration is calculated according to the amount of solution and is the amount necessary to produce a starting pH of 2 or less. In the case of 100 kg. of ore leaching in columns given as an example of this invention, starting pH was 1.69 for both bacterial leaching and acid-oxidation chemical leaching columns.

The $NaNO_3$ oxidizer concentration is calculated in accordance with the mass of sulphide contained in the ore. The approximate proportion needed to achieve complete dissolution of the sulphide ore is 1:1 for mass of sulphide to mass of nitrate. The $NaNO_3$ is mixed with the leaching solution and the amount of oxidizer needed to dissolve the sulphides completely is applied in aliquotes as the solution is cycled through the heap during the leaching process; that is, the total amount of $NaNO_3$ oxidizer is applied to the ore in the heap in the leaching period of time (170 days). In order to avoid an energetic oxidizing reaction which produces $NO_x$ gases, a weak $NaNO_3$ concentration solution is supplied constantly at 5 g/l, as in the case of the column leaching described above. The $NaNO_3$ oxidizer is consumed during the sulphide leaching process because it reacts with the sulphides, oxidizing Fe, S, and Cu; the $NaNO_3$ oxidizer itself becoming reduced in the process. These two factors are responsible for the sulphide heap leaching process.

The leach product (leachate) is collected on the liner and transferred through a system of collecting troughs, pipes and, if necessary, pumps, into a pool. The copper-rich solution is then transported from the pool to a solvent extraction plant through a system of pipes 21, including pumps if necessary.

If the leachate contains significant amounts of oxidizer, it is recirculated to a fresh ore heap as a conditioning step. Oxidation reduction potential (ORP) conditioning step 23 is reduces the excess oxidizer left over from heap leaching prior to solvent extraction. Conditioning is needed because the leach solution percolates a heap relatively quickly but reacts relatively slowly with the sulphides due both to the small sulphide surface area exposed in the crushed ore of the heap being leached and the small nitrate concentration in the solution. This phenomenon produces some excess nitrate that remains in the leachate solution, which is reduced by circulating the copper-rich solution through a fresh ore heap, thereby reducing the excess $NaNO_3$ by reaction with fresh sulphide ore.

Solvent extraction step 25 includes two phases. In the first phase, the copper is extracted from solution by a commercially available, organic extractant that is dissolved in a suitable solvent to capture the copper from the water based leaching solution. There are several commercially available extractants that can be used; such as LIX 63, LIX 64N, LIX 70, LIX 984, LIX 860, LIX 622, LIX 63–70, and LIX 54, available from Henkel Corp., SME529, available from Shell Chemical Co., and P5000 series, available from Acorga Ltd.

The second phase of the solvent extraction process is called rich solution processing and includes a "stripping" step and a solvent recovery step that provides re-cycled solvent. The copper is stripped from the copper-rich solution by mixing the extractant with concentrated sulphuric acid, producing an acidic solution very rich in copper that is directly amenable to electrowinning and a copper-depleted solution that is stored for reconditioning and recycling.

For electrowinning step 27, the copper-rich solution obtained from the solvent extraction process is stored in tanks and then transferred to an electrowinning plant, where the copper is recovered by cathodic electrodeposition from the solution onto copper "starting cathodes" (pure copper plates) or onto stainless steel plates, to form high purity, cathodic copper ready for industrial use.

The solution from which copper is removed by electrowinning is called "raffinate" solution. The raffinate solution is strongly acidic because the electrowinning process produces sulphuric acid as a by-product. The raffinate solution is recirculated through a system of pipes and pumps to send the raffinate solution back to the leaching pads after filtering, to eliminate suspended solids, and reconditioning. Reconditioning includes eliminating unwanted elements such as Fe and S that accumulate in the leachate solutions due to the common occurrence of Fe in the sulphides and S as sulphates that are derived from the oxidation of S to sulphate during the oxidizing leach process. In step 29, Fe and S are selectively precipitated from the solution as hydroxilated basic iron sulphate (jarosite) and other sulphate compounds, by increasing the pH of the solution through the addition of sulphuric acid. These materials are safe to discard because they are stable, non-polluting compounds commonly occurring in nature. Reconditioning also includes discarding excess raffinate solution and diluting the retained raffinate solution, step 31, with recycled water, or with fresh water, to obtain a leaching solution with the proper acid concentration needed for a new cycle. In accordance with the invention, step 33, $NaNO_3$ is added to replenish the oxidant consumed during the leaching process and to produce a fresh solution that is applied to a heap in a new leaching cycle, step 35.

EXAMPLE 1

A sample of 0.5 kg of high grade copper ore was crushed to <6 mm. The sample contained approximately 38% Cu as chalcocite ($Cu_2S$, 92%) and bornite ($Cu_5FeS_4$, 3%). A leaching solution was prepared in which 276 g. $H_2SO_4$ and 169 g. $NaNO_3$ were dissolved in water. The reactives were placed in a 3.5 liter beaker. The ore mass/water mass ratio was 1:7. Reaction continued for 59.75 days during which 25.5% of the Cu contained in the sample was extracted and a solution with 13 grams per liter Cu was obtained. It must be noted that at this copper concentration solution is directly amenable to solvent extraction and electrowinning. Initial pH was 2; final pH was 1. Reaction was slow due to the relatively small exposed surface area of the crushed sulfide ore. No $NO_x$ gases were generated during this test as evidenced by qualitative test for such gases.

EXAMPLE 2

The acid leaching process was conducted in parallel with self-inoculation bacterial leaching (i.e., bacterial leaching was only due to the biochemical activity caused by the bacteria originally present in the sample). The test parameters were as follows.

Ore mass: 101 kg

Ore particle size <6 mm.

Soluble Cu: 1.15% (mineral composition was 100% atacamite)

Sulfide Cu: 1.82% (mineral composition was major covellite and only minor chalcocite)

Total Cu content: 2.97%

Contained Cu: bacterial leaching test 2.99 kg; acid-oxidizing acid leaching test 2.96 kg Acid solution flow rate 0.24 $m^3/m^2$ day (240 $1/m^2$ day)

Acid cure: 15 kg $H_2SO_4$/900 kg. of ore

Leach solution:
9 g/l $H_2SO_4$ (for bacterial leaching)
9 g/l $H_2SO_4$+5 g/l $NaNO_3$ (for acid-oxidizing leaching)

Column height: 2.1 m

Column diameter: 0.2 m

Initial ore humidity: 1.3%
pH <1.69 throughout test
For bacterial leaching: Initial pH 1.01–Final pH 1.69
For acid-oxidizing leaching: Initial pH 0.99–Final pH 1.69

Figure 2:
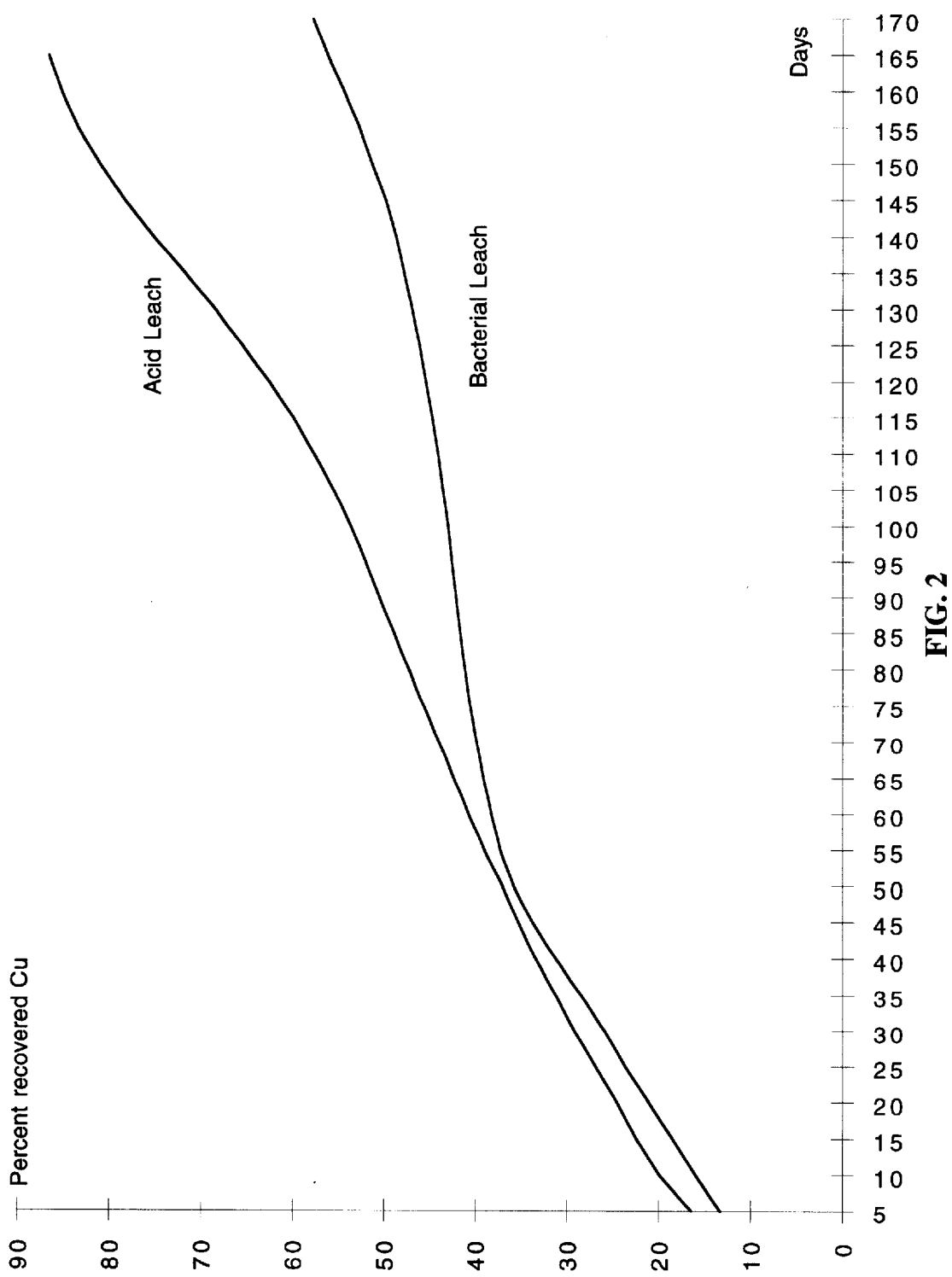
FIG. 2 is a chart comparing acid leaching in accordance with the invention with bacterial leaching.

FIG. 2 compares cumulative copper recovery from acid-oxidizing leaching and bacterial leaching. From day 1 and until day 50, there is a small advantage for the acid-oxidizing leaching process. From day 50 onward, there is a considerable difference in copper recovery, which favors the acid-oxidizing leaching process of the invention. At the end of the leaching period, bacterial leaching recovered 57.38% of the copper and acid leaching recovered 87.19% of the copper, about half again as much as the bacterial leaching.

In addition, the process of the invention recovered more than 85% of the copper in six months, rather than in nine months as in the prior art.

From the oxide ore (atacamite), 100% of the copper was leached in 55 days by the acid-oxidizing leaching process of the invention, whereas 100% of the copper was leached in 63 days by bacterial leaching. Thus, complete copper oxide dissolution was achieved in 87% of the time by the acid-oxidizing leaching process of the invention.

In none of the tests did the acid process in accordance with the invention produce $NO_x$ gases.

The invention thus provides a process for leaching copper-bearing ore that is faster and is cost competitive with other processes. The process does not use gaseous oxygen and does not produce $NO_x$ gases, eliminating the need for separate recovery apparatus. At least 85% of the available copper is recovered in less time than in the prior art.

Having thus described the invention, it will be apparent to those of skill in the art that various modifications can be made within the scope of the invention. For example, sodium sulphate can be added to the leach solution to buffer the action of the nitrate oxidizer. Thus the speed of the reaction can be augmented at will by increasing the nitrate oxidizer concentration and thereby increasing the speed of recovery of copper metal without generating $NO_x$ gases as a result of the increase in the concentration of $NaNO_3$.

What is claimed as the invention is:

1. In a method for removing copper or other metal from sulphide ore including the steps of crushing the ore, treating the ore with concentrated sulphuric acid, stacking the treated ore in a heap, irrigating the heap to produce a leach product, collecting the leach product from said heap, and recovering metal from the leach product by electrolysis to produce a depleted leach product, characterized in that the heap is irrigated with a dilute aqueous solution consisting essentially of sulphuric acid and sodium nitrate;

the sodium nitrate is consumed in the production of the leach product without producing NOx gases; and gaseous oxygen is not added to the ore.

2. The method as set forth in claim 1 wherein said ore is treated with approximately 15 kg. of concentrated sulphuric acid per 900 kg. of ore.

3. The method as set forth in claim 1 wherein the ore includes sulphides and the solution includes an amount of nitrate approximately equal to the amount of sulphide in the ore.

4. The method as set forth in claim 1 wherein the solution includes sufficient sulphuric acid to produce a $pH \leq 2$ in the solution.

5. The method as set forth in claim 1 wherein said irrigating step and said collecting step are repeated.

6. The method as set forth in claim 5 wherein said recovering step is followed by the step of conditioning the depleted leach product by replacing the nitrate consumed during leaching.

7. The method as set forth in claim 1 and further including the step of:

adding sodium nitrate to the dilute aqueous solution to increase the speed of recovery of copper without producing $NO_x$ gases.

8. The method as set forth in claim 7 and further including the step of:

adding sodium sulphate to the dilute aqueous solution to buffer the oxidizing action of the nitrate.

* * * * *